US012777321B2

(12) United States Patent
Shrivastava

(10) Patent No.: US 12,777,321 B2
(45) Date of Patent: Oct. 27, 2026

(54) AUTONOMOUS OPERATION OF USER EQUIPMENT WITH ARTIFICIAL INTELLIGENCE/MACHINE LEARNING MODEL CAPABILITY

(71) Applicant: SHARP Kabushiki Kaisha, Sakai City (JP)

(72) Inventor: Rudraksh Shrivastava, Erligheim (DE)

(73) Assignee: SHARP KABUSHIKI KAISHA, Sakai City (JP)

( * ) Notice: Subject to any disclaimer, the term of this patent is extended or adjusted under 35 U.S.C. 154(b) by 345 days.

(21) Appl. No.: 18/296,833

(22) Filed: Apr. 6, 2023

(65) Prior Publication Data

US 2024/0340634 A1 Oct. 10, 2024

(51) Int. Cl.
*H04W 8/22* (2009.01)
*H04W 48/02* (2009.01)

(52) U.S. Cl.
CPC ............. *H04W 8/22* (2013.01); *H04W 48/02* (2013.01)

(58) Field of Classification Search
CPC ................................ H04W 8/22; H04W 48/02
See application file for complete search history.

(56) References Cited

U.S. PATENT DOCUMENTS

2023/0093963 A1 * 3/2023 Kumar .................... H04L 41/16 370/252
2023/0224693 A1 * 7/2023 Li ............................. G06F 9/50 370/329
2024/0008067 A1 * 1/2024 Park ........................ H04L 41/16
2025/0048085 A1 * 2/2025 Wang ................... H04B 7/0658

FOREIGN PATENT DOCUMENTS

WO WO-2024122867 A1 * 6/2024 ............ H04W 76/22

OTHER PUBLICATIONS

R2-2300398, 3GPP TSG-RAN WG2 Meeting #121, Athens, Greece, Feb. 27-Mar. 3, 2023, Nokia, Nokia Shanghai Bell "AI/ML methods".
R2-2Xxxxxx, GPP TSG-RAN WG2 Meeting #121, Athens, Greece, Feb. 27-Mar. 3, 2023, RAN2 Chairman (MediaTek), "Chair Notes".
R1-2301254, 3GPP TSG RAN WG1 #112, Athens, Greece, Feb. 27-Mar. 3, 2023, Samsung, "General aspects of AI ML framework and evaluation methodology".
R1-230Xxxx, 3GPP TSG RAN WG1 Meeting #112bis-e, Online, Apr. 17-26, 2023, MCC Support, "Draft Report of 3GPP TSG RAN WG1 #112 v0.4.0" (Athens, Greece, Feb. 27-Mar. 3, 2023).
U.S. Appl. No. 18/296,799, filed Apr. 2023, Shrivastava.

* cited by examiner

*Primary Examiner* — Vladimir Magloire
(74) *Attorney, Agent, or Firm* — ScienBiziP, P.C.

(57) ABSTRACT

A wireless terminal comprising receiver circuitry, processor circuitry, and transmitter circuitry. The receiver circuitry is configured to receive from a radio access network at least one message which requests the wireless terminal to report Artificial Intelligence/Machine Learning Model (AI/ML) related information to the network. The processor circuitry is configured to generate at least one resource restriction response message from the wireless terminal. The resource restriction response message comprises an indication that the wireless terminal guards AI/ML model and/or AI/ML functions of the wireless terminal. The transmitter circuitry is configured to transmit the at least one resource restriction response message to the network.

13 Claims, 8 Drawing Sheets

AUTONOMOUS OPERATION OF USER EQUIPMENT WITH ARTIFICIAL INTELLIGENCE/MACHINE LEARNING MODEL CAPABILITY

TECHNICAL FIELD

The technology relates to wireless communications, and particularly to telecommunications nodes such as access nodes and mobile stations, e.g., wireless terminals, that utilize artificial intelligence (AI) and/or machine learning (ML).

BACKGROUND

A radio access network typically resides between wireless devices, such as user equipment (UEs), mobile phones, mobile stations, or any other device having wireless termination, and a core network. Example of radio access network types includes the GRAN, GSM radio access network; the GERAN, which includes EDGE packet radio services; UTRAN, the UMTS radio access network; E-UTRAN, which includes Long-Term Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of an access node or base station may include, depending on radio access technology type, a Node B ("NB"), an enhanced Node B ("eNB"), a home eNB ("HeNB"), a gNB (for a New Radio ["NR" ] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in FIG. 1, and is also described in 3GPP TS 38.300. The 5G NR network is comprised of NG RAN, Next Generation Radio Access Network, and 5GC, 5G Core Network. As shown, NGRAN is comprised of gNBs, e.g., 5G Base stations, and ng-eNBs, i.e., LTE base stations. An Xn interface exists between gNB-gNB, between (gNB)-(ng-eNB) and between (ng-eNB)-(ng-eNB). The Xn is the network interface between NG-RAN nodes. Xn-U stands for Xn User Plane interface and Xn-C stands for Xn Control Plane interface. A NG interface exists between 5GC and the base stations, i.e., gNB & ng-eNB. A gNB node provides NR user plane and control plane protocol terminations towards the UE, and is connected via the NG interface to the 5GC. The 5G NR, New Radio, gNB is connected to AMF, Access and Mobility Management Function, and UPF, User Plane Function, in the 5GC, 5G Core Network.

In general, "artificial intelligence" (AI) refers to processes and algorithms that are able to simulate human intelligence, including mimicking cognitive functions such as perception, learning and problem solving. Artificial intelligence includes the concept of artificial intelligence (AI) models, which pertain to, e.g., the creation, training, and deployment of machine learning algorithms that emulate logical decision-making based on available data. An AI "model" may be an algorithm which, e.g., emulates logical decision making or prediction making based on available data with minimal or no human intervention. Machine learning (ML) is a subset of AI. ML may include applications of AI that allow machines to extract knowledge from data and learn from it autonomously. As summarized below, use of artificial intelligence (AI) and/or machine learning (ML) have been envisioned to a limited degree for telecommunications.

For example, in RAN-1 112 the following working assumptions were agreed:

- For UE-side models and UE-part of two-sided models:
  - For AI/ML functionality identification
    - Reuse legacy 3GPP framework of Features as a starting point for discussion.
    - UE indicates supported functionalities/functionality for a given sub-use-case.
  - UE capability reporting is taken as starting point.
  - For AI/ML model identification
    - Models are identified by model ID at the Network. UE indicates supported AI/ML models.
  - In functionality-based LCM
    - Network indicates activation/deactivation/fallback/switching of AI/ML functionality via 3GPP signaling (e.g., RRC, MAC-CE, DCI).
    - Models may not be identified at the Network, and UE may perform model-level LCM.
      - Study whether and how much awareness/interaction NW should have about model-level LCM.
  - In model-ID-based LCM, models are identified at the Network, and Network/UE may activate/deactivate/select/switch individual AI/ML models via model ID.
- FFS: Relationship between functionality identification and model identification
- FFS: Performance monitoring and RAN4 impact
- FFS: detailed understanding on model
  - AI/ML-enabled Feature refers to a Feature where AI/ML may be used.
  - For functionality identification, there may be either one or more than one Functionalities defined within an AI/ML-enabled feature.
- For 3GPP AI/ML for PHY SI discussion, when companies report model complexity, the complexity shall be reported in terms of "number of real-value model parameters" and "number of real-value operations" regardless of underlying model arithmetic.

In the last RAN1 #111 meeting, the following working assumption was achieved for the terminologies of model identification and functionality identification:

| Working Assumption | |
|---|---|
| Terminology | Description |
| Model identification | A process/method of identifying an AI/ML model for the common understanding between the NW and the UE<br>Note: The process/method of model identification may or may not be applicable.<br>Note: Information regarding the AI/ML model may be shared during model identification. |
| Functionality identification | A process/method of identifying an AI/ML functionality for the common understanding between the NW and the UE<br>Note: Information regarding the AI/ML functionality may be shared during functionality identification.<br>FFS: granularity of functionality |

Note:
whether and how to indicate Functionality will be discussed separately.

Also in the last meeting, the following agreements on model monitoring were approved:

Agreement
Study AI/ML model monitoring for at least the following purposes: model activation, deactivation, selection, switching, fallback, and update (including re-training).
FFS: Model selection refers to the selection of an AI/ML model among models for the same functionality. (Exact terminology to be discussed/defined)
Agreement
Study at least the following metrics/methods for AI/ML model monitoring in lifecycle management per use case:

- Monitoring based on inference accuracy, including metrics related to intermediate KPIs.
- Monitoring based on system performance, including metrics related to system performance KPIs.
- Other monitoring solutions, at least following 2 options.
  - Monitoring based on data distribution.
    - Input-based: e.g., Monitoring the validity of the AI/ML input, e.g., out-of-distribution detection, drift detection of input data, or SNR, delay spread, etc.
    - Output-based: e.g., drift detection of output data
  - Monitoring based on applicable condition.

Note:
Model monitoring metric calculation may be done at NW or UE

Considering the above agreements and working assumptions, in RAN-1 and RAN-2 it is being discussed that a wireless terminal, e.g., UE, may identify an AI/ML model using a model ID and functionality.

Two approaches for AI/ML Life Cycle Management (LCM) have been identified so far in the 3GPP RAN-1/2 discussions, namely Model-ID based LCM and the Model functionality-based LCM.

In Model-ID based LCM, the AI/ML functionality and the associated model are identified by an explicit model ID. In this case, the model ID is mapped to an AI/ML model or algorithm. Thus, the UE may report its artificial intelligence (AI)/machine learning (ML) capability by including the model identifier(s), e.g., model ID(s), for the supported models to the gNB. With this information, the gNB may provide the corresponding LCM assistance utilizing model ID. For transferring the model, the model ID may be used for model identification which may help in selecting a target model for downloading or uploading.

In Model functionality-based LCM, by contrast, the model functionality is used to point to a model. In other words, model functionality is mapped to the model and model is identified via the associated model functionality. For example, the supported functionalities, e.g., use case, configuration, scenario, for a certain use case, e.g., (e.g., channel estimation, positioning or beamforming, can be specified. Then, the UE may report its capability in relation to the specified functionality. Thus, the network can assign a model ID corresponding to the supported functionality in an implicit manner. This approach is comparable to legacy approach for capability report and corresponding RRC configurations.

Considering, e.g., the foregoing, for AI/ML model LCM purpose, the UE may report its AI/ML capability to the network for model (de) activation, switching, fall back procedure. A UE may have the capability to support AI/ML operations and model LCM which may be fixed, but its ability at different times to support AI/ML model or associated functionality and meet related performance KPIs may be different depending on device performance key performance indicators, KPIs, such as live run-time capabilities, environment, device type, use-case, scenario, device computation usage, power-consumption, antenna configuration etc. The AI/ML model must adapt to the dynamic run-time capabilities of the UE such as RF and Power/resource consumption status etc. that exist at the UE. Also, the UE may need to optimize its hardware and software resources to support various models and their functions associated to intended use-cases. Such optimizations are critical to consistently meet model and device performance KPIs.

A UE or a device may need to support one or more AI/ML based models/functionality and match the expected model performance KPIs. But at certain times due to the limitations of the device hardware/software resources and/or network side limitations (e.g., signaling delay, resource allocation, model transfer etc.), it may not be able to always support a specific AI/ML model(s) or functionality. Also, the gNB should not configure the UE with more AI/ML models or functionalities beyond UE's capabilities to support it at a given time. Thus, at a given time, gNB may not be aware of real time UE capabilities to support a model or functionality, associated with a target use case.

What is needed are, e.g., methods, apparatus, and/or techniques for coordinating a wireless terminal and a telecommunications network so that the wireless terminal may, e.g., report to the network the wireless terminal's status or live run-time capabilities to be able to support AI/ML models and related functionalities at a given time.

SUMMARY

According to one of its example aspects, the technology disclosed herein concerns a network including one or more nodes which comprises processor circuitry and interface circuitry. The processor circuitry is configured to generate at least one message which requests the wireless terminal to report Artificial Intelligence/Machine Learning Model (AI/ML) related information to the network. The interface circuitry configured to transmit the at least one message to the wireless terminal. Methods of operating such networks are also provided.

In another of its example aspects the technology disclosed herein concerns a wireless terminal which communicates over a radio interface with a radio access network. The wireless terminal comprises receiver circuitry, processor circuitry, and transmitter circuitry. The receiver circuitry is configured to receive from the radio access network at least one message which requests the wireless terminal to report Artificial Intelligence/Machine Learning Model (AI/ML) related information to the network. The processor circuitry configured to generate at least one response message comprising the AI/ML related information of the wireless terminal which is requested in the at least one message. The transmitter circuitry configured to transmit the at least one response message to the network. Methods of operating such wireless terminals are also provided.

In another of its example aspects the technology disclosed herein concerns a network including one or more nodes which comprise processor circuitry and interface circuitry. The processor circuitry is configured to generate at least one message which requests the wireless terminal to report Artificial Intelligence/Machine Learning Model (AI/ML) related information to the network. The interface circuitry is configured: to transmit the at least one message to the wireless terminal; and to receive at least one resource restriction response message from the wireless terminal, the resource restriction response message comprising an indication that the wireless terminal guards AI/ML model and/or AI/ML functions of the wireless terminal. Methods of operating such networks are also provided.

In another of its example aspects the technology disclosed herein concerns a wireless terminal comprising receiver circuitry, processor circuitry, and transmitter circuitry. The receiver circuitry is configured to receive from a radio access network at least one message which requests the wireless terminal to report Artificial Intelligence/Machine Learning Model (AI/ML) related information to the network. The processor circuitry is configured to generate at least one resource restriction response message from the wireless terminal. The resource restriction response message comprises an indication that the wireless terminal guards AI/ML model and/or AI/ML functions of the wireless terminal. The transmitter circuitry is configured to transmit the at least one resource restriction response message to the network. Methods of operating such wireless terminals are also provided.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

0.0 Introduction: Generic Network Architecture

Figure 2:
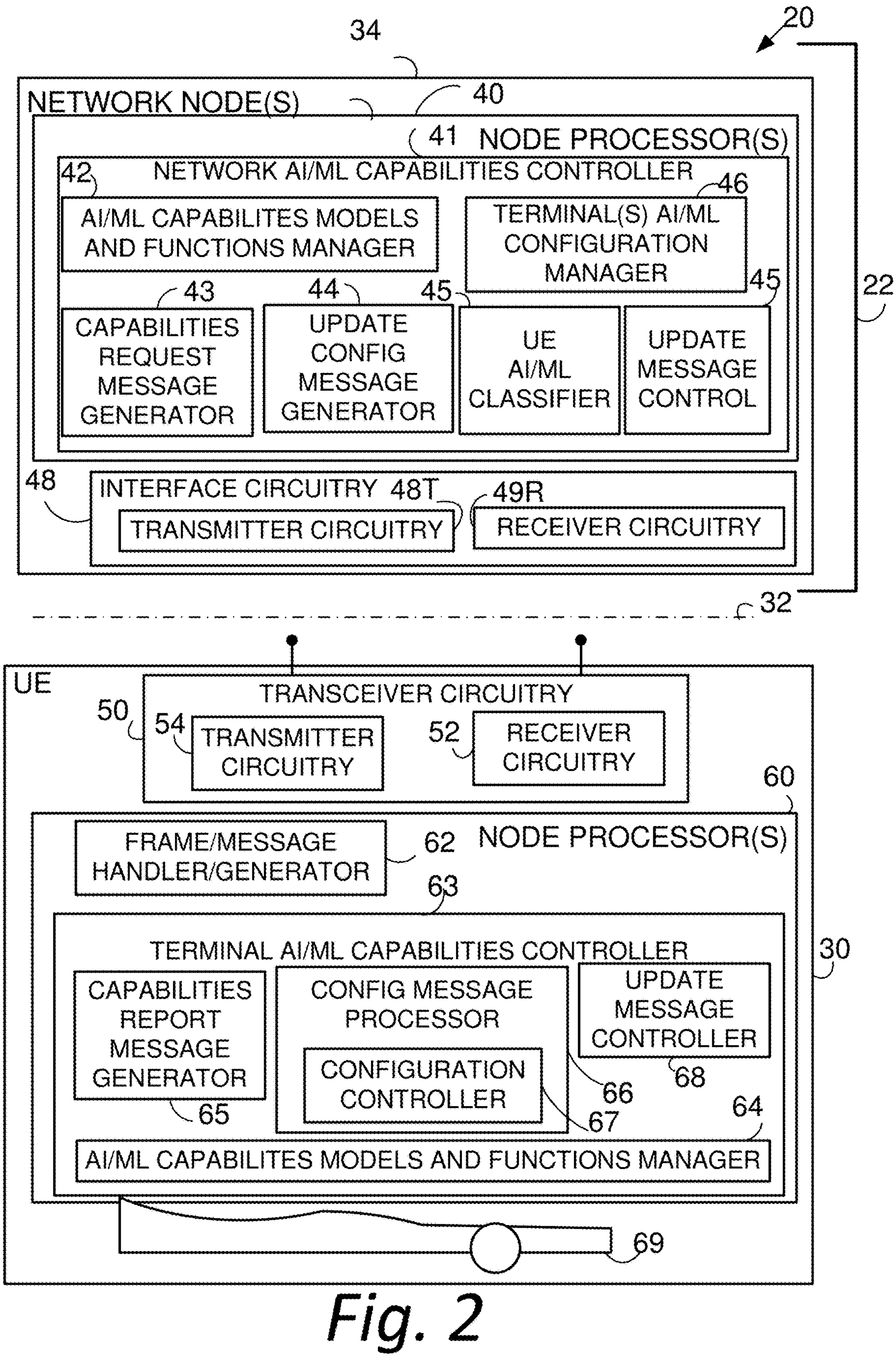
FIG. 2 is a schematic view of an example embodiment and mode of a communications system in which a wireless terminal has artificial intelligence/machine learning model capability.

FIG. 2 shows communications system 20 which comprises communication network 22. As used herein, the term "telecommunication system" or "communications system" can refer to any network of devices used to transmit information. A non-limiting example of a telecommunication system is a cellular network or other wireless communication system. As used herein, the term "cellular network" or "cellular radio access network" can refer to a network distributed over cells, each cell served by at least one fixed-location transceiver, such as a base station. A "cell" may be any communication channel. All or a subset of the cell may be adopted by 3GPP as licensed bands, e.g., frequency band, to be used for communication between a base station, such as a Node B, and a UE terminal. A cellular network using frequency bands can include configured cells. Configured cells can include cells of which a UE terminal is aware and in which it is allowed by a base station to transmit or receive information. Examples of cellular radio access networks include E-UTRAN or New Radio, NR, and any successors thereof, e.g., NUTRAN.

Figure 3:
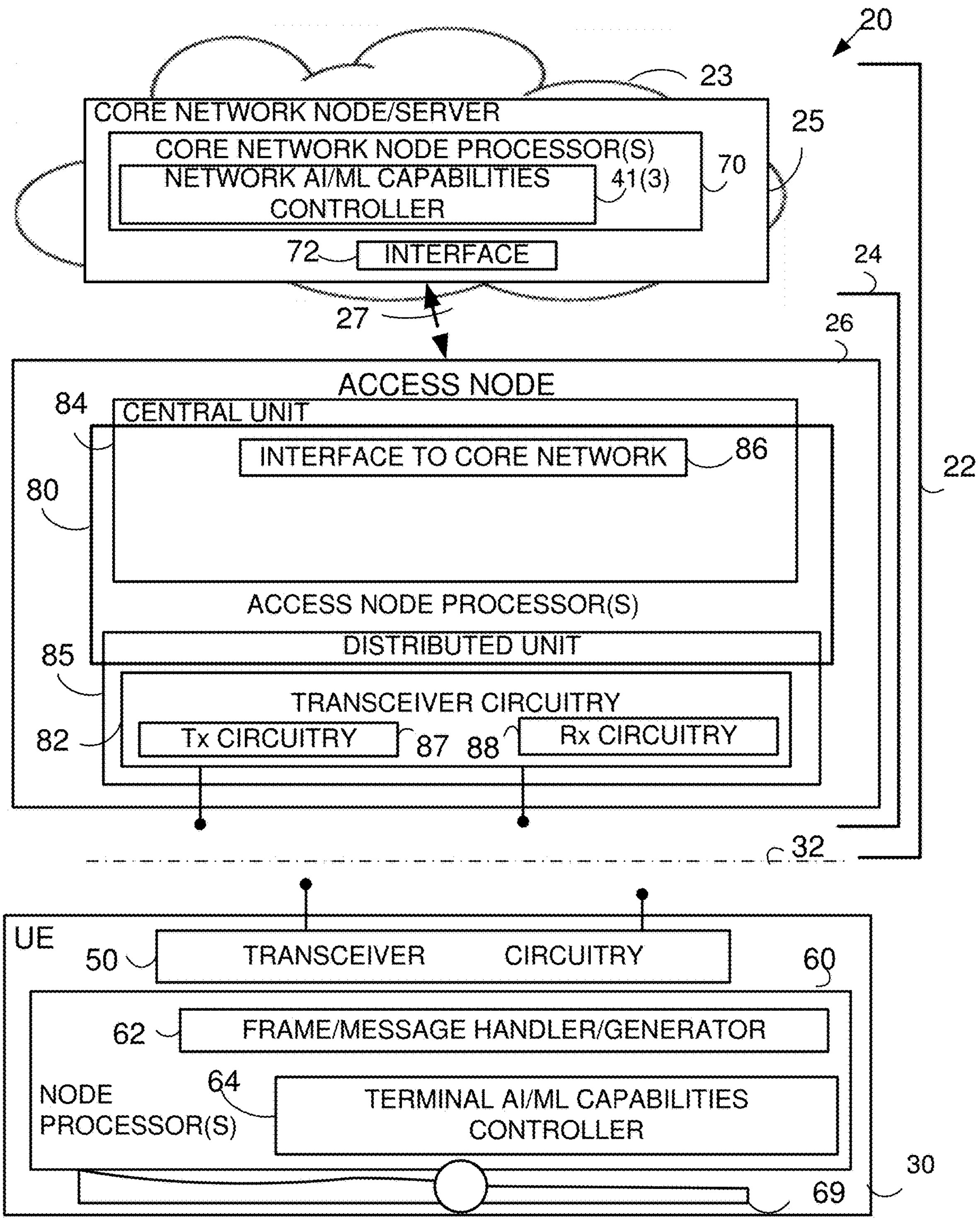
FIG. 3 is a schematic view of an example implementation of the first example embodiment and mode of FIG. 2 in which the network node is a core network node.

As understood, e.g., with reference to FIG. 3, the communication network 22 typically comprises at least one core network 23 and one radio access network 24. The core network 23 may comprise one or more core network nodes or servers, such as core network node 25 shown in FIG. 3. A core network, CN, such as core network (CN) 23 may comprise numerous servers, routers, and other equipment. As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc. For example, core network (CN) 23 may comprise one or more management entities, which may be an Access and Mobility Management Function, AMF.

Also as understood, e.g., with reference to FIG. 3, the communication network 22 typically comprises at least one radio access network 24. The radio access network 24 typically comprises one or more access nodes, such as access node 26 shown in FIG. 3. The radio access network 24, and hence its access nodes, are connected to the core network 23 by core network/radio access interface link(s) 27. The core network/radio access interface link(s) 27 may be, for example, a RAN-CN interface (e.g., N2 interface).

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR" ] technology system), or some other similar terminology. The access node 26 may include, for example, one or more types of relay nodes.

The communication system 20 of FIG. 2 further comprises wireless terminal 30, which also may be referred to as user equipment or UE 30. The wireless terminal 30, for which pertinent aspects are described in further detail below, communicates over a radio or wireless interface 32 with the radio access network 24. Depending on system and circumstances of operation, the wireless terminal 30 may wirelessly communicate with one or more access nodes 26 of one or more radio access networks 24. As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

Communication between radio access network (RAN) 24 and wireless terminal over the radio interface occurs by utilization of "resources". Any reference to a "resource" herein means "radio resource" unless otherwise clear from the context that another meaning is intended. In general, as used herein a radio resource ("resource") is a time-frequency unit that can carry information across a radio interface, e.g., either signal information or data information.

An example of a radio resource occurs in the context of a "frame" of information that is typically formatted and prepared, e.g., by a node. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. An LTE subframe is divided into two slots (so that there are thus 20 slots in a frame). The transmitted signal in each slot is described by a resource grid comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. A resource element, RE, is the smallest time-frequency unit for downlink transmission in the subframe. That is, one symbol on one sub-carrier in the subframe comprises a resource element (RE) which is uniquely defined by an index pair (k, l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix.

In 5G New Radio ("NR"), a frame consists of 10 ms duration. A frame consists of 10 subframes with each having 1 ms duration similar to LTE. Each subframe consists of 29 slots. Each slot can have either 14 (normal CP) or 12 (extended CP) OFDM symbols. A Slot is typical unit for transmission used by scheduling mechanism. NR allows transmission to start at any OFDM symbol and to last only as many symbols as required for communication. This is known as "mini-slot" transmission. This facilitates very low latency for critical data communication as well as minimizes interference to other RF links. Mini-slot helps to achieve lower latency in 5G NR architecture. Unlike slot, mini-slots are not tied to the frame structure. It helps in puncturing the existing frame without waiting to be scheduled. See, for example, https://www.rfwireless-world.com/5G/5G-NR-Mini-Slot.html, which is incorporated herein by reference.

The technology disclosed herein involves and/or concerns coordination between network and UE such the UE may be configured to report to the network its status or live run-time capabilities to be able to support AI/ML models and related functionalities at a given time. Both the UE and the network may adapt and optimize to support the desired AI/ML model and functions to meet the performance KPIs. The technology disclosed herein proposes, e.g., both UE-initiated and network-initiated reporting and modification procedures for monitoring and modifying UE run-time capabilities, for e.g., using L1/L2/L3 or upper layer signaling, as well as model-based changes that includes model (de) activation, switching, fall back etc., for e.g., using DCI, MAC, RRC signaling etc.

Figure 6:
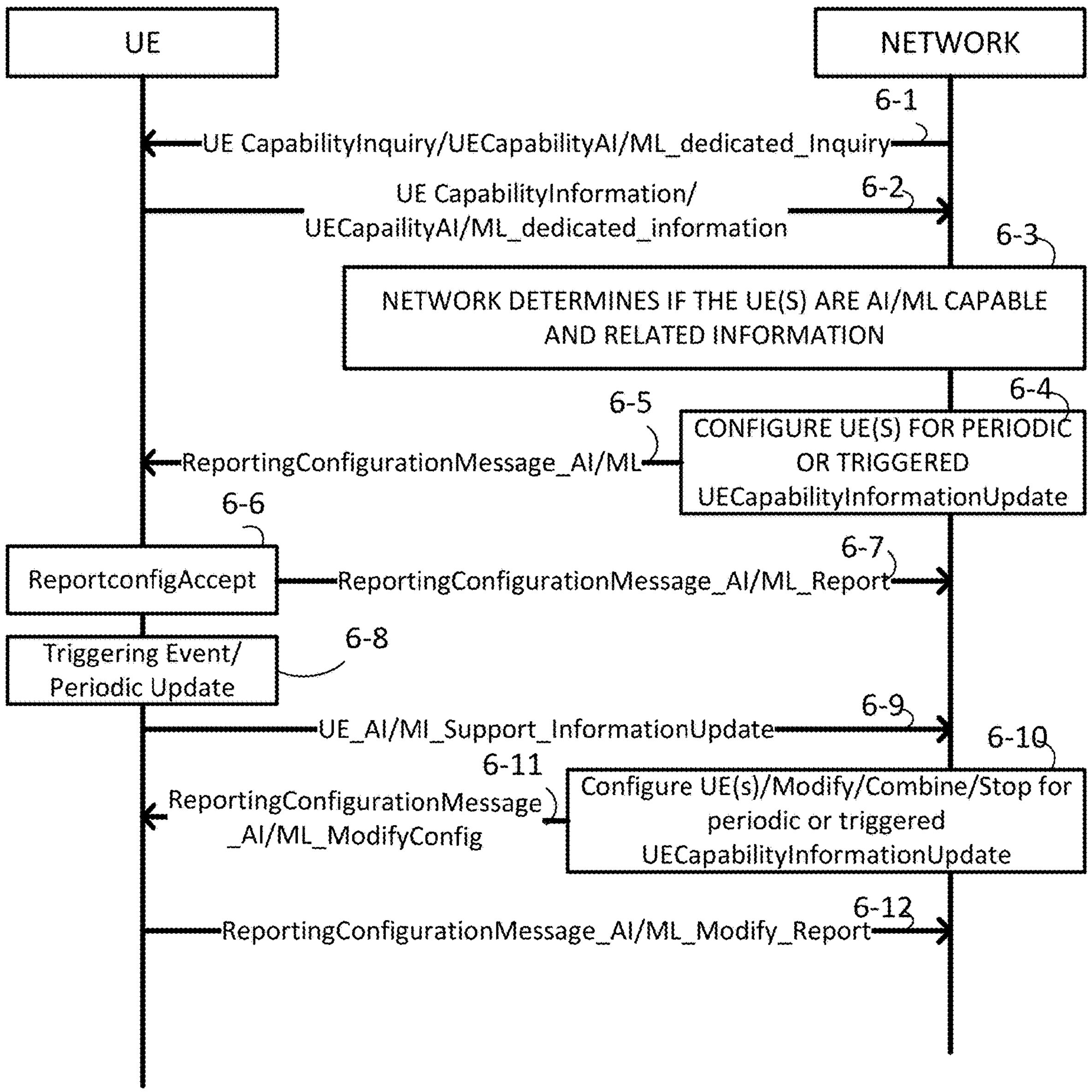
FIG. 6 is a diagrammatic view showing an example scenario in which the network triggers AI/ML run-time capability/support information to one or several UE(s).
Figure 8:
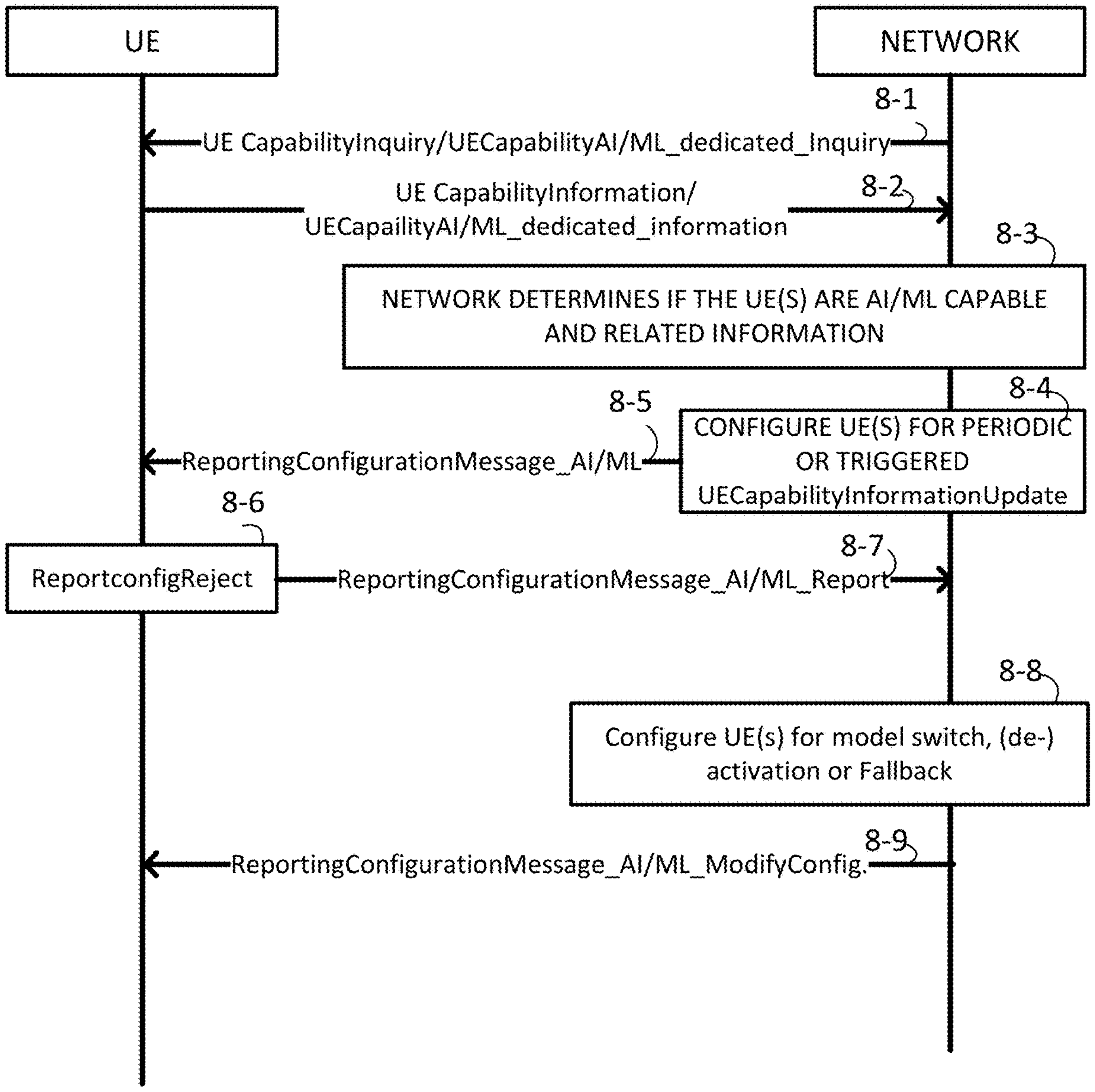
FIG. 8 is a diagrammatic view showing an example scenario in which a wireless terminal autonomous operates with artificial intelligence/machine learning model capability.

FIG. 6 shows an example method of operation of communication system 20 and an example embodiment and mode in which the communication network 22 configures operation of a wireless terminal, e.g., wireless terminal 30, which has artificial intelligence/machine learning model capability. By contrast, FIG. 8 shows an example method of operation of communication system 20 and example embodiment and mode in which a wireless terminal autonomous operates with artificial intelligence/machine learning model capability. In both example embodiments and modes one or more nodes of the network may interact or communicate with the wireless terminal 30 which has the Artificial Intelligence/Machine Learning Model Capability. Such one or more nodes may be one or more nodes of core network 23, or one or more nodes of radio access network 24, or a combination of nodes comprising core network 23 and radio access network 24. For sake of simplicity, the one or more nodes of the network which communicate with the wireless terminal 30 are generically and/or collectively referred to as network node 34. Thus, it should be understood that network node 34 may, in potentially differing example embodiments and modes, be one or more nodes of core network 23, one or more nodes of radio access network 24, or may be distributed between one or more nodes of core network 23 and radio access network 24.

As mentioned above, FIG. 2 shows an example communication system 20 and in which wireless terminal 30 has artificial intelligence/machine learning model capability. As show in FIG. 2, the network node 34 comprises network node processor(s) 40. The network node processor(s) 40 may perform many functionalities for its resident node, as understood by those skilled in the art. For performing example functions germane to the example embodiment and mode of FIG. 2, the network node processor(s) 40 may further comprise network artificial intelligence/machine learning capabilities controller 41, e.g., AI/ML capabilities controller 41. The AI/ML capabilities controller 41 in turn may comprise artificial intelligence/machine learning capabilities models and functions manger 42, e.g., AI/ML capabilities models and functions manger 42; capabilities request message manager 43; update configuration message generator 44; UE AI/ML classifier 45; update message controller 46; and terminals AI/ML configuration manager 47.

The network node 34 may further comprise network node interface circuitry 48. The network node interface circuitry 47 in turn may comprise network node transmitter circuitry 48T and network node receiver circuitry 49R.

As described herein, an example non-limiting purpose of network node 34 is to generate at least one message which requests the wireless terminal to report artificial intelligence/machine learning model (AI/ML) related information to the network. As used herein, "Artificial Intelligence/Machine Learning Model (AI/ML) related information" includes, for example, any information that may be used to describe or characterize a model in terms of one or more of identity, features, capability, construction, content, or operation, for example. For example, "Artificial Intelligence/Machine Learning Model (AI/ML) related information" may include AI/ML capability information, model related parameters e.g. size of model (e.g. storage requirement), model complexity, model delivery method, Inference/training complexity and latency, (monitoring, data collection, model delivery) latency, resource usage information, processing delays, UE side hardware/software resources, network resources, _collaboration type and level between the UE and the network, positioning information, etc.

Such message may be generated by capabilities request message manager 43, which may be realized by network node processor(s) 40. The network node interface circuitry 47 is configured to and serves to transmit the at least one message to the wireless terminal.

FIG. 2 further shows that the wireless terminal 30 may comprise wireless terminal transceiver circuitry 50. The wireless terminal transceiver circuitry 50 may in turn comprise wireless terminal receiver circuitry 52 and wireless terminal transmitter circuitry 54. The transceiver circuitry 50 may include antenna(e) for wireless transmission. The wireless terminal transmitter circuitry 54 may include, e.g., amplifier(s), modulation circuitry and other conventional transmission equipment. The wireless terminal receiver circuitry 52 may comprise, e.g., amplifiers, demodulation circuitry, and other conventional receiver equipment.

FIG. 2 further shows wireless terminal 30 also comprising wireless terminal processor circuitry, e.g., one or more wireless terminal processor(s) 60. The wireless terminal 116, e.g., wireless terminal processor(s) 60, may comprise frame/message generator/handler 62. As is understood by those skilled in the art, in some telecommunications system messages, signals, and/or data are communicated over a radio or air interface using one or more "resources", e.g., "radio resource(s)".

The wireless terminal processor(s) 60 may perform many functionalities for its wireless terminal, as understood by those skilled in the art. For performing example functions germane to the example embodiment and mode of FIG. 2, the wireless terminal processor(s) 60 may further comprise terminal AI/ML capabilities controller 63. The terminal AI/ML capabilities controller 63 may in turn comprise terminal AI/ML capabilities models and functions manager 64; capabilities report message generator 65; configuration message processor 66; configuration controller 67; and update message controller 68.

The wireless terminal 30 may also comprise interfaces 69, including one or more user interfaces. Such user interfaces may serve for both user input and output operations and may comprise (for example) a screen such as a touch screen that can both display information to the user and receive information entered by the user. The user interface 69 may also include other types of devices, such as a speaker, a microphone, or a haptic feedback device, for example.

Figure 4:
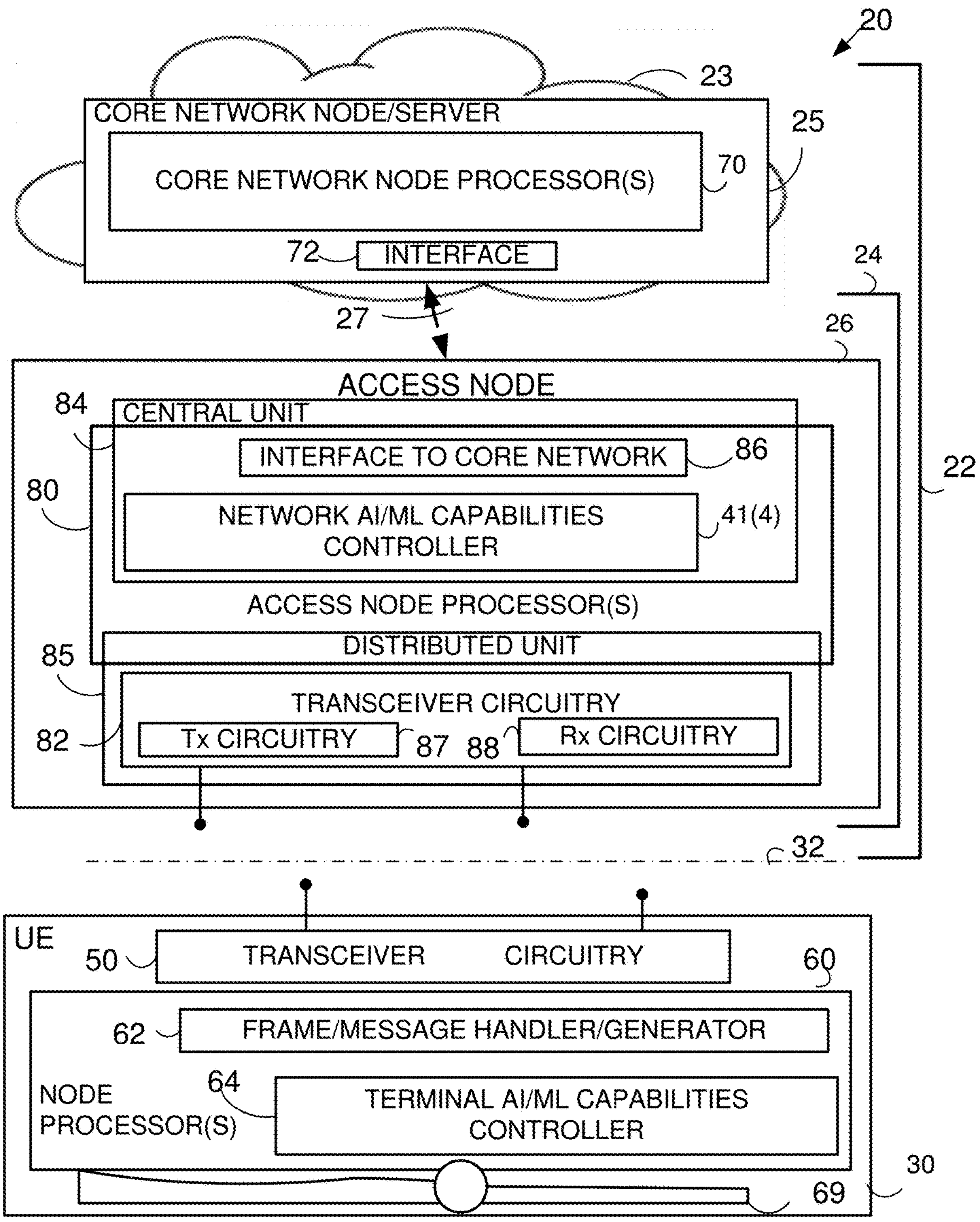
FIG. 4 is a schematic view of an example implementation of the first example embodiment and mode of FIG. 2 in which the network node is a radio access network node.
Figure 5:
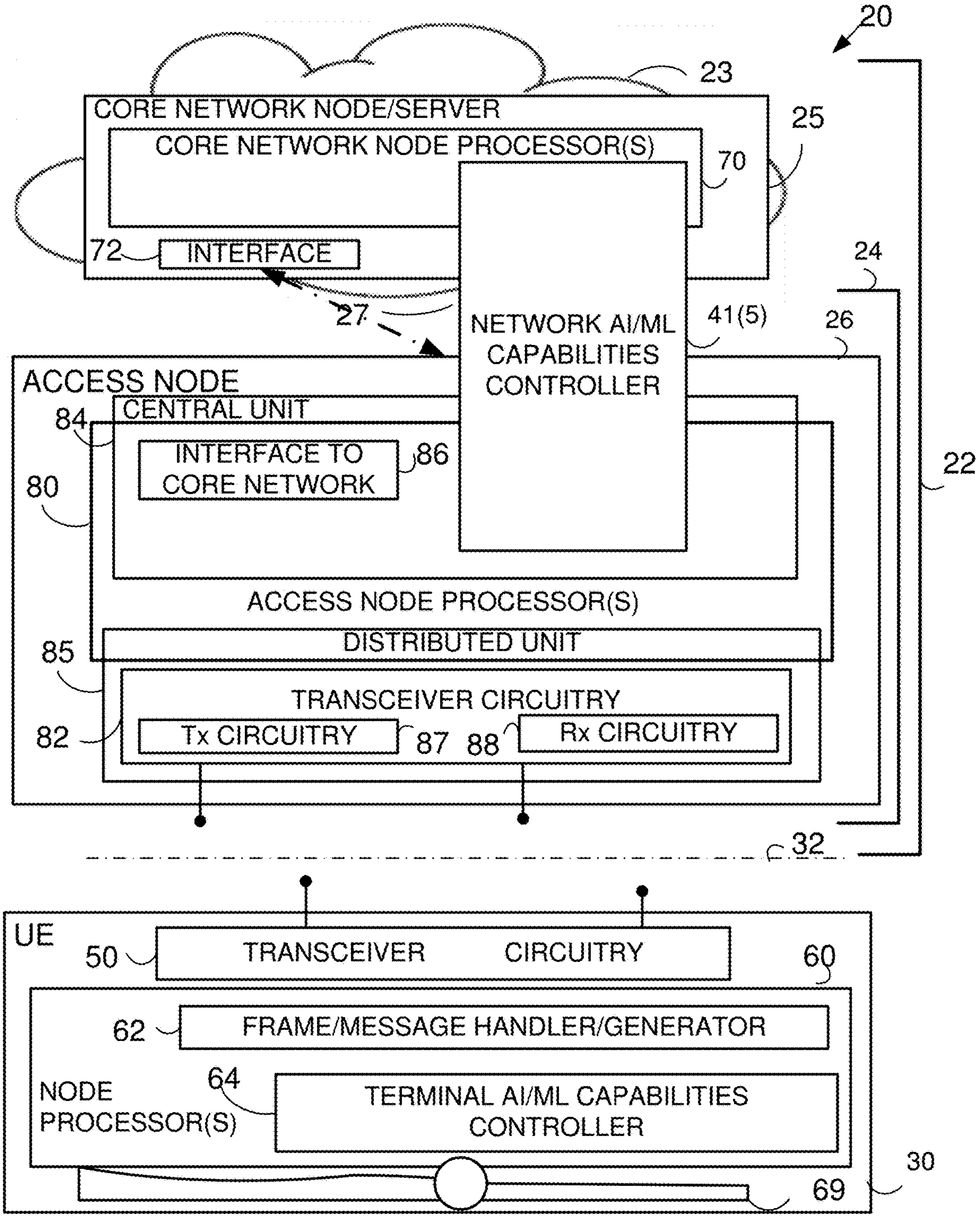
FIG. 5 is a schematic view of an example implementation of the first example embodiment and mode of FIG. 2 in which the network node is distributed between a core network and a radio access network.

It was mentioned above that network node 34 may, in potentially differing example embodiments and modes, be one or more nodes of core network 23, one or more nodes of radio access network 24, or may be distributed between one or more nodes of core network 23 and radio access network 24. FIG. 3-FIG. 5 shows example embodiments and modes of communication network 22 in which core network 23 comprises core network node 25 and radio access network 24 comprises access node 26. The core network node 25 in turn comprises core network node processor(s) 70 and core network node interface(s) circuitry 72.

The access node 26 of FIG. 3-FIG. 5 may comprise access node processor(s) 80 and access node transceiver circuitry 82. The access node 26 may comprise distributed architecture and may also comprise access node central unit 84 and access node distributed unit 85. The access node central unit 84 may comprise access node interface circuitry 86 to the core network 23. The access node distributed unit 85 may comprise access node transceiver circuitry 82. The access node transceiver circuitry 82 may include access node transmitter circuitry 87 and access node receiver circuitry 188.

In the example embodiment and mode of FIG. 3 the network node 34 comprises the core network node 25 since the AI/ML capabilities controller 41(3) resides in the core network node 25. By contrast, in the example embodiment and mode of FIG. 4 the network node 34 comprises the access node 26 since the AI/ML capabilities controller 41(4) resides in the access node 26 of FIG. 4. By further contrast, in the example embodiment and mode of FIG. 5 the network node 34 comprises both the core network node 25 and the access node 26 since the AI/ML capabilities controller 41(5) resides at least partially in both the core network node 25 and in the access node 26 of FIG. 5, e.g., is distributed among one or more nodes of the core network 23 and radio access network 24.

Figure 7A:
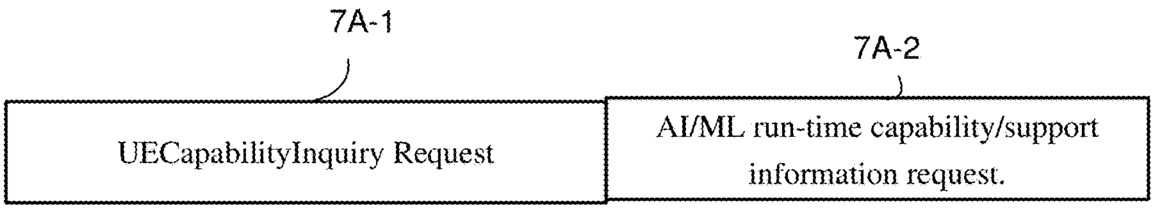
FIG. 7A is a diagrammatic view of an extended message which includes a first message portion that comprises UECapabilityInquiry Request and a second message portion that comprises an AI/ML run-time capability/support information request.
Figure 7B:
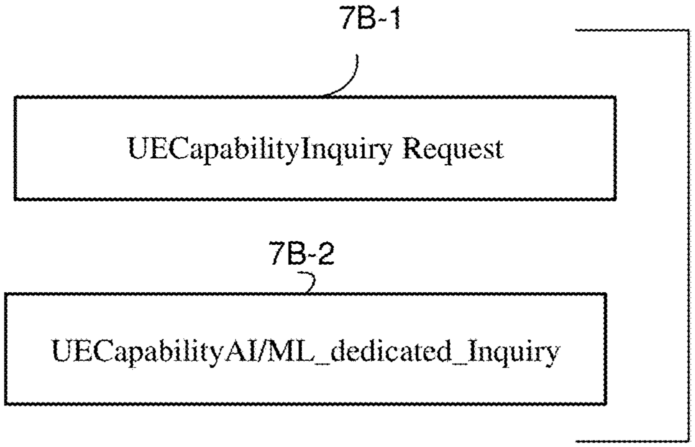
FIG. 7B is a diagrammatic view of a set of messages including a UECapabilityInquiry message and a new message called UECapabilityAI/ML_dedicated_Inquiry.

1.0 Network Configured Operation of User Equipment with Artificial Intelligence/Machine Learning Model Capability According to the example embodiment and mode of FIG. 6, the technology disclosed herein discloses a method on how the network may configure one or more UE(s) to report AI/ML related run-time capability/support information and updates on a periodic or triggered manner. The invention describes how the UE compiles and transfers its model run-time capability/support information related updates upon receiving an AI/ML model support and run-time capability related information request from the network. The UECapabilityInquiry Request to the UE(s) may be extended include AI/ML run-time capability/support information request. FIG. 7A shows such an extended message which includes a first message portion 7A-1 that comprises the UECapabilityInquiry Request and a second message portion 7A-2 that comprises the AI/ML run-time capability/support information request.

FIG. 6 thus shows an example scenario in which the network, e.g., a network node(s) 34, triggers AI/ML run-time capability/support information to one or several UE(s). The acts of FIG. 6 are described below.

In act 6-1 of FIG. 6, the network triggers the capability request via UECapabilityInquiry. Act 6-1 may be performed by the capabilities request message manager 43 of network node 34, for example. This message may be extended to include selective or all UE AI/ML related capability/support information request, as shown in FIG. 7A. This message could comprise an additional or separate custom message and may further be customized to only selective parameter/configuration, i.e., not all AI/ML related information needs to be reported but only required/specific information request and reporting is supported, reporting associated to an AI/ML model or functionality. Thus, for this additional or separate target purpose a new message called UECapabilityAI/ML_dedicated_Inquiry may be introduced. For example, FIG. 7A shows use of a new message called UECapabilityAI/ML_dedicated_Inquiry 7B-2 in addition to a conventional message UECapabilityInquiry 7B-1. In this example embodiment and mode, in one option, it is possible to consider two types of AI/IL UE capabilities that a UE or network may explicitly or implicitly indicate. Implicit indication could be for example in indicating the two capabilities in separate messages.

The network and/or UE may also identify type-1 and type-2 capabilities individually or separately in same or different messages. Type-1: AI/ML Capability is like the UE capability that is fixed and does not change dynamically. It is maximum capability a UE can support. Type-2 may be defined as run-time AI/ML support capability where, at a given time based on UE's device and model performance parameters like UE's environment, compute power availability, power consumption, AI/ML model LCM parameters, model use-case, antenna configuration, location etc., the device may support only limited number of AI/ML models and functionalities. Type-2 capability is dynamic and may vary over time based on UE's environment and hardware/software resource usage. In this invention report we consider both AI/ML, UE Capability options. In type-1 the focus is on reporting fixed capabilities via a new dedicated message or an existing extended message. In type-2 the focus is on monitoring and reporting of Type 2 AI/ML device capabilities in a dynamic UE environment using a new dedicated message or an existing extended message. This may help the network in AI/ML model management, LCM and checking the feasibility of associated functionality to applicable use case at a given time. This may help the network to modify itself and configure the UE in an efficient way.

The message exchange may be done for e.g., using UE assistance information, measurement reports (e.g., CSI, measurement, RRM or a new report etc.) or PHY/MAC/RRC layer signaling or upper layer signaling, e.g., signaling specified for location management function and/or but not limited to L1/L2/L3 layer messaging. In another option, the network may have the option to request AI/ML related capability information separately via dedicated or broadcast/multicast signaling procedure.

In response to the request of act 6-1, in act 6-2, the UE(s) respond(s) to the network by reporting their capabilities in UECapabilityInformation. The message of act 6-2 from a UE/wireless terminal 30 may be generated by capabilities report message generator 65, for example. The message in act 6-1 from the network may trigger UE to report supported capabilities to the network such as RAT type, SupportedBandCombinations, featureSets and featureSetCombinations for NR as well as E-UTRA. This message may be extended to include all or selective UE AI/ML related capability information report. Both type-1 and type-2 capabilities may be reported by the UE in this message to the network. However, if the network has requested only UECapabilityAI/ML_dedicated_Inquiry in a separate dedicated custom request, then the UE(s) may report only selective or all AI/ML associated capability information (type-1 and/or type-2) to the network using a separate dedicated custom message/UE specific message UECapabilityAI/ML_dedicated_Information.

The message exchange may be done for e.g., using UE assistance information, measurement reports or PHY/MAC/RRC layer signaling or upper layer signaling, e.g., signaling specified for location management function and/or but not limited to L1/L2/L3 layer messaging. Broadcast/multicast signaling may also be used to indicate/communicate one or more UEs.

In another option, the network may have the option to request type-1 and/or type-2 AI/ML related capability information separately via dedicated or broadcast/multicast signaling procedure. This message could be an additional or separate custom message and may further be customized to report only specific parameter/configuration (i.e., not all AI/ML related information needs to be reported but only selective information request and reporting is supported) reporting associated to an AI/ML model or functionality. Thus, for this additional or separate target purpose a new message, from UE to the network, called UECapabilityAI/ML_dedicated_Information may be introduced.

In the act 6-3, after receiving the UECapabilityInformation from the UE(s) either via extended or dedicated/custom/separate message request, the network sorts the UE(s) in line with their AI/ML supporting capabilities. Act 6-3 may be performed, for example, by UE AI/ML classifier 45. For this sorting, the network may use type-1 or type-2 capabilities or a combination of both. The network may prioritize/select UE(s) to which requires to be configured to provide periodic or triggered UECapabilityInformation updates. This sorting may be performed for example but not limited to using LCM parameters, monitoring requirements, model features and KPIs, model type, UE position, device type, model delivery procedure etc. There may be two types of KPIs that may also be considered, for example model performance KPIs which are associated with the use case and the UE/device capability or complexity related KPIs. The model performance KPI may include for example feedback overhead, inference latency etc. The UE/device capability related KPIs may include for example computational complexity, device type, model delivery method, overhead associated with AI/ML model life-cycle management, power consumption, memory storage and other associated hardware requirements (including for given processing delays), GPU/CPU frequency, computation power (CPU/GPU)(e.g., flops) required for each function, supported functionalities by the UE, e.g., CSI enhancement, and/or beam management and/or positioning, etc. Other related KPIs that may be considered include size of model (storage requirement), model complexity, Inference/training complexity and latency e.g., number of FLOPS, number of supported model/functionalities, Model management complexity and also generalization Performance of a model, when a single model is deployed across multiple deployment scenarios e.g., a model deployed across various scenarios like UE speed, antenna configurations etc. Some models may be deployed in multiple scenarios if any variations in a particular scenario cause only acceptable changes/degradation in the model performance. This means that some trained AI model may be generalized across different scenarios.

As act 6-4, the selected UE(s) are configured at network node 34 to report any modifications or update in their run-time AI/ML support capability, refers to type-2 capability, either periodically or based on some conditions. The configuration of the selected UE(s) at network node 34 may be performed by update message controller 46, for example. The selected UE(s) are configured to report any modifications or update in their run-time AI/ML support capability using a message called ReportingConfigurationMessage_AI/ML, which is transmitted by network node 34 as act 6-5. ReportingConfigurationMessage_AI/ML configures the UE(s) to provide UE run-time AI/ML support capability (type-2) either periodically or based on pre-configured conditions based on for e.g., but not limited to Model performance and/or capability KPIs as described in act 6-2. The triggering conditions may be also a combination of one or more KPIs for e.g., either/or model performance and Capability KPIs. If there are any changes in the capability (type-2 capability variation) or performance KPIs it could trigger UE to report the changes (e.g., capabilities, current usage, or remaining processing capabilities) with a simple dedicated reporting structure, like power head room (PHR) [or buffer status report (BSR)].

The report may be, for example but not limited to include a report of:

- Remaining processing power in flops, or
- Remaining processing power in percentage of total processing capabilities . . .
- The process power may consider the model complexity and battery power etc.

The report may be periodic or triggered if exceeds a threshold, e.g., if the remaining processing power is not sufficient to start a new model. Additional side information reporting can also be considered. The thresholds may be self-configured by the UE or the network using for e.g., ReportingConfigurationMessage_AI/ML message (L1/L2/L3 or higher layer signaling or measurement reports).

Further triggering conditions and triggering types for which network/UE may (pre-) configure or define thresholds/limits may include for example:

- GPUs and processor frequency, or a #flops.
- Functions that can be supported by the UE, e.g., CSI enhancement, and/or beam management and/or positioning, etc.
  - More details such as the computation power (e.g., flops) required for each function.
- Number of models for each supported function . . .
  - More details such as the computation power required for each model.
- Total number of simultaneous running AI/ML models can be supported by the UE.
- If any model or capability information (type-1/type-2) associated UE timers expires.

Given the above information, the network, for example a gNB may activate/deactivate the models to not exceed the UE AI/ML capabilities (type-1 and type-2). A model may be activated/deactivated by UE or gNB. This can be done for example using RRC/MAC or DCI signaling. If the model is (de) activated, switched etc. by the UE it may indicate it to the network with or without cause for the change.

The network may also individually configure UE(s) with different UE specific triggering conditions or periodic reporting command.

The network configures the UE to report its run-time AI/ML support capability information (type 2) using ReportingConfigurationMessage_AI/ML. This may be event based (based on triggering conditions) or in a periodic manner. In another option, the UE may also initiate the request to the network to configure reporting of run-time AI/ML support capability information (type 2). Alternatively, the UE itself may report or indicate if it cannot support any model or related functionalities at a given time without prior configuration via an error code or message. In another option, a default configuration (for e.g., with default triggering conditions or thresholds) may be provided to UEs via network to perform run-time AI/ML support capability information updates.

Upon receiving the ReportingConfigurationMessage_AI/ML of act 6-5 Message, as act 6-6 UE may accept or reject the request/model-based configuration from the network and report this to the network. The acceptance or rejection of the request/model-based configuration from the network and the reporting of the acceptance or rejection may be performed by configuration controller 67. As act 6-7 the report is sent back to the network using ReportingConfigurationMessage_AI/ML_Report.

If the ReportingConfigurationMessage_AI/ML of act 6-5 is accepted and acknowledged to the network, as act 6-8 the UE detects or determines the occurrence of a triggering event or time for a period update. The detection or determination of act 6-8 may be performed by update message controller 68, for example. At those times the UE(s) may report to the network any modifications/updates in their type-2 capabilities based on configured triggering conditions in an even based reporting manner. If the UE(s) are configured to provide a periodic capability update and no update indication is sent to the network this may be considered an implicit information for no changes in the UE run-time AI/ML support capability. In another option, if the ReportingConfigurationMessage_AI/ML is configured and accepted e.g., for the event-based reporting and there are no updates, no indication may implicitly mean that UE(s) capability has not changed.

Thus, as shown by act 6-8, any change in the UE/device capability related KPIs or model performance KPI may trigger the UE to report it to the network based on the configured UE capability reporting parameters, timeline and triggering conditions. In another option, described in Section 2.0 hereof, the UE—may autonomously 'self' de-activate functions/features and/or run-time capabilities, for e.g., type-2 capability, hardware/software resources, etc., if it cannot support additional requests from the network. This may be reported by the UE to the network via L1/L2/L3 or upper layer signaling or RRM/UE assistance report etc.

In another option, the UE may make changes, e.g., on its own, to the model configuration or parameters such as (de) activate/switch, fall back, parameter modification etc., and report the intended changes to the network.

For both the type-2 capability changes and/or the model-based modifications, the UE may adopt a timer-based approach. Once UE decides to make self-modification autonomously to either type-2 capabilities and/or model or functions' modifications, it may start a timer (may be (pre) configured by the network) and indicate to the network. The network needs to respond within that timer if any modifications in the type-2 capability and/or model/function configuration and application or if any alternative configurations are needed or if the intended changes are accepted/rejected. If there is no response from the network within the timer limit and the timer expires it may implicitly mean that the network accepted the UE intended modifications and the UE will implement the intended action once the timer expires.

As shown by act 6-9, changes in UE(s) capability (type-1 and/or type-2 capabilities) are reported to the network via UE_AI/ML_Support_InformationUpdate message.

Upon receiving UE_AI/ML_Support_InformationUpdate, as shown by act 6-10 the network may (de) activate, switch/change the model, or indicate UE to switch to fall back legacy functionality. Such (de) activation, switching/changing the model, or indicating UE to switch to fall back legacy functionality may be performed by update message controller 46. The network may modify the UE capability reporting procedure, it may also initiate or stop new functionalities, it may also allocate new IDs to the model associated to a target functionality. The network may also (de)prioritize use of selected models. The network may also do not provide any update and keep the existing settings. The network may also request to switch between UE-side, Network side or Hybrid (partially UE/Network) side models. In another option, based on the UE's ability to support AI/ML model or functionality at a given time, it may itself initiate or request the network the corresponding actions for e.g., model (de) activate, switch/change the model or (de) prioritize model/functionality or indicate UE to switch to fall back legacy functionality. This could be done by, e.g., using L1/L2/L3 e.g. (DCI/MAC/RRC) or upper layer signaling. In another option, the UE may provide recommendations or preferences for its desired/supported model or corresponding action either in the UE_AI/ML_Support_InformationUpdate message or a separate message or in measurement reports. This step may also be performed earlier or later in the signaling process.

As act 6-11 the network may update the ReportingConfigurationMessage_AI/ML. and reporting conditions/rules and/or any changes in models usage/prioritization, functionality/scenario/use case, model parameters, performance KPIs, LCM and monitoring KPIs etc. using the ReportingConfigurationMessage_AI/ML_ModifyConfig. The network may also indicate the UE to keep monitoring and reporting as per configured rules or to stop monitoring and reporting.

The UE may accept or reject the ReportingConfigurationMessage_AI/ML_ModifyConfig message which the UE received in act 6-11. The acceptance or rejection may be performed by configuration controller 67, for example. If the UE rejects, the UE may send the ReportingConfigurationMessage_AI/IL_Modify_Report message of act 6-12.

Upon receiving a rejection such as that communicated in act 6-12, the network may indicate UE(s) to fall back to legacy procedures or re-configure all the associated capabilities from the start. The network may also indicate the UE to keep monitoring and reporting as per configured rules or to stop monitoring and reporting.

Thus, the example embodiment and mode of FIG. 2-FIG. 5 may cover and encompass configuration by the network for request/report UE run-time capability, type-2 capability and sorting of UEs as per the type-1 and type-2 capabilities and their associated triggering conditions. In this case, the UE reports according to the configuration done by the network and support modifications in the configuration by the network based on the report from the UE as shown in FIG. 2. Alternative options to the proposed solution related to this example embodiment and mode are also encompassed hereby.

2.0 Autonomous Operation of User Equipment with Artificial Intelligence/Machine Learning Model Capability FIG. 8 shows an example scenario in which a wireless terminal of the system 20 of FIG. 2-FIG. 5 may autonomously operate with artificial intelligence/machine learning model capability. The example embodiment and mode of FIG. 8 encompasses situations in which the UE autonomously guards or restricts its available type-2 capability resources and reports it to the network as shown in FIG. 8. The UE may also autonomously self (de)activate a part or all models (including also model update, switching, fallback etc.), associated functionalities and configurations. For this, a timer-based approach may also be used.

Acts 8-1 to and including act 8-5 of FIG. 8 are similar to respective act 6-1 through act 6-5 of FIG. 6, and thus have essentially been described above. However, the method of FIG. 8 differs from the method of FIG. 6 in that, in the method of FIG. 8, the wireless terminal or UE may restrict or guard its available run-time capability/support resources, e.g., type-2 capability, from the network. The UE may desire to do so for, e.g., for its own intended use for other AI/ML model or functions or for future updates of the model or applications, etc. The restriction or guarding by wireless terminal 30 of its available run-time capability/support resources may be performed by configuration controller 67. The UE may report its guarding or restriction to the network as shown in act 8-7 by a message depicted as ReportingConfigurationMessage_AI/ML_Report. The message of act 8-7 may also be referred to herein as a resource restriction response message, or a support inability message.

The guarding or restricting performed by wireless terminal 30 reflected by act 8-6 may be based on a decision which is essentially independently made by wireless terminal 30, i.e., by configuration controller 67. Alternatively, the network may also indicate the UE to guard/restrict its type-2 capability resources for future actions for e.g., model updates, switching, etc. For example, the network node 34 may send an instruction, command, signal, or directive to wireless terminal 30 that requires or induces the wireless terminal 30 to make the decision to reject or guard the available run-time capability/support resources, in which case the decision of rejection or guarding of act 8-6 is essentially predetermined by the network.

In an example embodiment and mode, the cause for limiting the availability of UE type-2 capability to the network may also be reported, e.g., as a parameter or information element in the message of act 8-7 or an additional message. When the network receives the Reporting- ConfigurationMessage_AI/ML. report of act 8-7 from the device/UE, as depicted by act 8-8 the network may initiate AI/ML model switch, (de) activation or trigger fallback to the legacy mode of operation. In another example embodiment and mode, the network may also request to switch between UE-side, Network side or Hybrid (partially UE/Network) side models to make the most efficient use of the UE type-2 capabilities available to it and support the target KPIs. The corresponding action is indicated by the network to the device in act 8-9 via ReportingConfigurationMessage_AI/ML_ModifyConfig. Message. The network may also indicate the UE to keep monitoring and reporting as per configured rules and indicate to the network when the desired model related run-time capability/AI/ML support feature (minimum type-2 capabilities) is available again (maybe by setting up a threshold type of a trigger/event) or it can indicate to the UE to stop monitoring and reporting.

In another embodiment the UE may self-(de)activate either model based features/functions and/or type-2 run-time capability resources and report it to the network with or without the cause.

For act 8-6 and act 8-7, a timer-based approach, as described in act 8-8 above may also be applied.

In another option, ideally, the gNB should not configure the UE with more AI/ML models or functionalities beyond UE's type-1 and/or type-2 capabilities reported initially to the network. For this periodic or event-based updates on UE's type-2 capabilities may be helpful. However, if the gNB indicates a new AI/ML model activation/switching etc., that the UE cannot support, the UE may update its own capabilities (type-2 capabilities) report it to the network if required, or it can decline the request and provide an error code.

3.0 Further Considerations

Thus, in some of its example aspects the technology disclosed herein involves structure and operation of mobile base station relays and nodes operating in conjunction therewith, including but not limited to the following:

- A method for configuring and reporting AI/ML model based fixed and dynamic run-time UE capabilities to the network. The fixed and dynamic run-time capabilities maybe mapped by the UE or Network or any controlling entity to one or more use-case or functionality-LCM aspect e.g., model delivery, inference, monitoring, reporting, switching, update etc.
- The network and UE coordinate such that network may configure the UE to report to the network its status or live run-time capabilities and fixed UE capability to be able to support AI/ML models and related functionalities at a given time. This may be configured in a periodic or even-based manner using for e.g., using L1/L2/L3 or upper layer signaling. The network and/or UE may identify live-run-time capabilities and fixed capability individually or separately and indicate it in same or separate messages.
- Alternatively, the UE may request the network to configure reporting or itself report (for e.g., based on (pre) configuration) or indicate if it cannot support any model features/functions or related capability functionalities at a given time. Thus, if at a given time UE cannot support an AI/ML model/functionality due to limitations on its run-time capabilities, it can report it to the network and the network may configure or indicate corresponding or alternative actions to the UE such that the UE can achieve desired results and meet the KPIs from AI/ML model and device performance perspective.
- Triggers or events are configured by the network that may lead UE to initiate procedure to change its AI/ML model status or configuration including modification to the run-time capabilities. Alternatively based on the pre-defined/configured triggers or events, the network may also change a UE's AI/ML model configuration for e.g. (de) activate or switch model, initiate model update or deliver a new model or indicate UE to fall back to legacy procedures etc. and/or request changes to the run-time capabilities of the UE to support AI/ML model features, functions, and use-cases.
- The UE may further autonomously guard or restricts its available run-time capability resources and report it to the network. The UE may also autonomously self (de)activate a part or all AI/ML model-based functionalities such as (de) activate/switch, fall back, parameter modification etc., and report the intended changes to the network. This may be reported by the UE to the network via L1/L2/L3 or upper layer signaling or measurement/UE assistance report etc.
- The modifications in UE run-time capabilities and/or AI/ML model features may also be requested by the network for e.g., based on UE reports. This may be reported by the UE to the network via L1/L2/L3 or upper layer signaling etc.
- A timer-based approach may also be adopted to apply and report the desired changes in UE run-time capabilities and/or AI/ML model features either by the UE or as requested by network. It is discussed in detail in response to question 12 of this invention.
- Alternative options to the proposed solution are also encompassed hereby.

Figure 1:
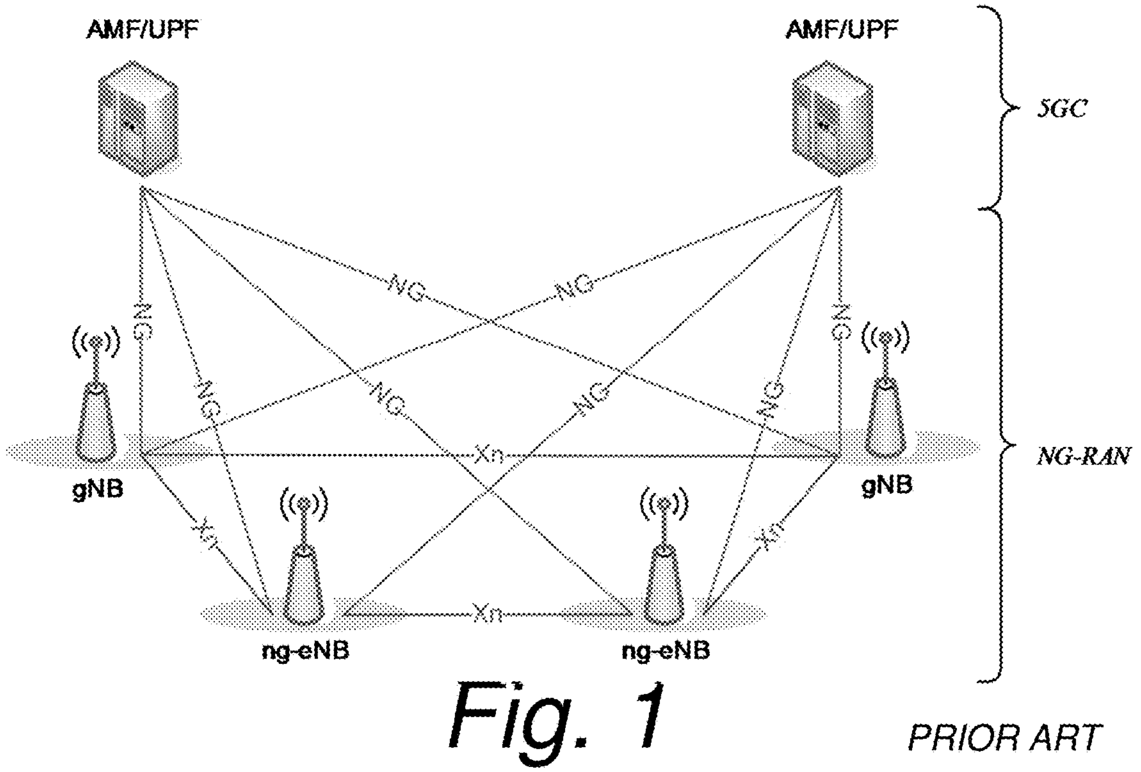
Fig. 1 PRIOR ART
FIG. 1 is a diagrammatic view of overall architecture for a 5G New Radio system.
Figure 9:
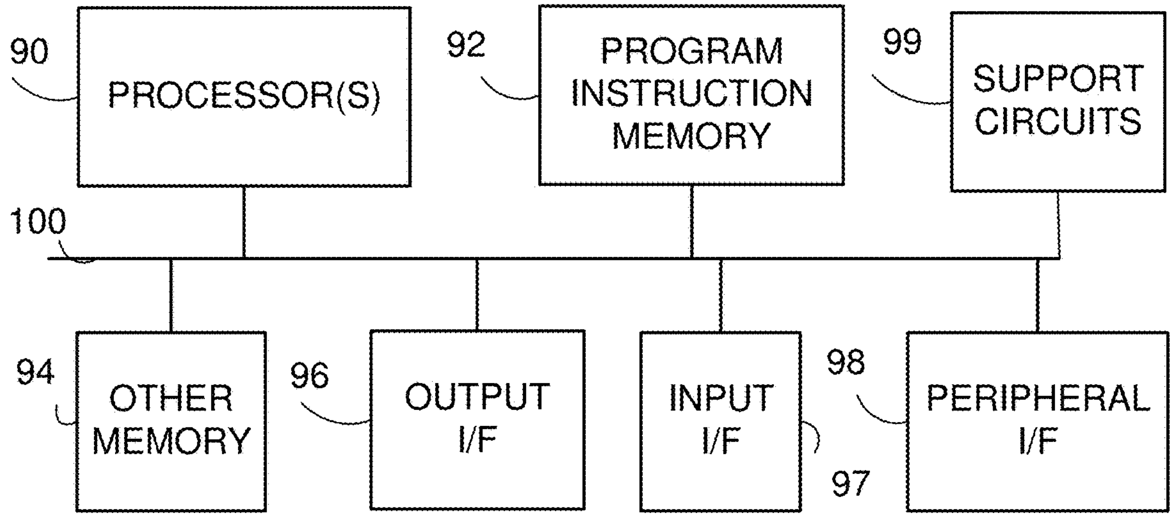
FIG. 9 is a diagrammatic view showing example elements comprising electronic machinery which may comprise a wireless terminal, a radio access node, and a core network node according to an example embodiment and mode.

Certain units and functionalities of the systems 20 may be implemented by electronic machinery. For example, electronic machinery may refer to the processor circuitry described herein, such as terminal processor circuitry 60, core network node processor(s) 70, AND access node processor(s) 80. Moreover, the term "processor circuitry" is not limited to mean one processor, but may include plural processors, with the plural processors operating at one or more sites. Moreover, as used herein the term "server" is not confined to one server unit but may encompass plural servers and/or other electronic equipment and may be co-located at one site or distributed to different sites. With these understandings, FIG. 9 shows an example of electronic machinery, e.g., processor circuitry, as comprising one or more processors 90, program instruction memory 92; other memory 94 (e.g., RAM, cache, etc.); input/output interfaces 96 and 97, peripheral interfaces 98; support circuits 99; and busses 100 for communication between the aforementioned units. The processor(s) 90 may comprise the processor circuitries described herein, for example, wireless terminal processor(s) 60, core network node processor(s) 70, access node processor(s) 80, or any processor(s) of a network entity of the core network.

A memory or register described herein may be depicted by memory 94, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 99 are coupled to the processors 90 for supporting the processor in a conventional manner. These circuits include cache, power supplies, clock circuits, input/output circuitry and subsystems, and the like.

The term “configured” may relate to the capacity of a device whether the device is in an operational or non-operational state. Configured may also refer to specific settings in a device that affect the operational characteristics of the device whether the device is in an operational or nonoperational state. In other words, the hardware, software, firmware, registers, memory values, and/or the like may be “configured” within a device, whether the device is in an operational or nonoperational state, to provide the device with specific characteristics.

An interface may be a hardware interface, a firmware Interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as “computer”, “processor” or “controller”, may be provided using hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term “processor” or “controller” may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

The technology of the example embodiments and modes described herein encompasses a non-transitory computer readable medium encoded with a computer program that, when executed by a computer or processor of the wireless terminal described herein, causes the computer to implement the acts described herein, and/or a non-transitory computer readable medium encoded with a computer program that, when executed by a computer or processor of the mobile base station relay described herein, causes the computer to implement the acts described herein.

Moreover, each functional block or various features of the wireless terminals and nodes employed in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves operation of wireless terminals with artificial intelligence/machine learning model capability.

The technology disclosed herein encompasses one or more of the following non-limiting, non-exclusive example embodiments and modes:

Example Embodiment 1: A network including one or more nodes which comprises:

processor circuitry configured to generate at least one message which requests the wireless terminal to report Artificial Intelligence/Machine Learning Model (AI/ML) related information to the network;

interface circuitry configured to transmit the at least one message to the wireless terminal.

Example Embodiment 2: The network of Example Embodiment 1, wherein the network comprises an access node which includes the processor circuitry.

Example Embodiment 3: The network of Example Embodiment 1, wherein the network comprises a core network node which includes the processor circuitry.

Example Embodiment 4: The network of Example Embodiment 1, wherein the AI/ML related information comprises AI/ML related capability information of the wireless terminal.

Example Embodiment 5: The network of Example Embodiment 1, wherein the AI/ML related information comprises AI/ML related support information of the wireless terminal.

Example Embodiment 6: The network of Example Embodiment 1, wherein the interface circuitry is configured to transmit the at least one message using L1/L2/L3 or upper layer signaling.

Example Embodiment 7: The network of Example Embodiment 1, wherein the interface circuitry is configured to transmit the at least one message using dedicated or broadcast/multicast signaling.

Example Embodiment 8: The network of Example Embodiment 1, wherein the at least one message comprises identities of live-run-time information and/or fixed information that are to be reported.

Example Embodiment 9: The network of Example Embodiment 8, wherein the at least one message identifies the run-time information and the fixed information individually or separately.

Example Embodiment 10: The network of Example Embodiment 8, wherein the run-time information and the fixed information are identified in a same message.

Example Embodiment 11: The network of Example Embodiment 8, wherein the run-time information and the fixed information are identified in different messages.

Example Embodiment 12: The network of Example Embodiment 1, wherein the at least one message which requests the wireless terminal to report the AI/ML related information is an extended version of a message that requests that the wireless terminal report non-AI/ML related information.

Example Embodiment 13: The network of Example Embodiment 1, wherein the at least one message requests the wireless terminal to report the AI/ML related information is in addition to another message that requests that the wireless terminal report non-AI/ML related information.

Example Embodiment 14: The network of Example Embodiment 1, wherein the at least one message requests the wireless terminal to report a subset of AI/ML related information of the wireless terminal to the network.

Example Embodiment 15: The network of Example Embodiment 11, wherein the subset of AI/ML related information comprises run-time AI/ML support capability which may vary over time.

Example Embodiment 16: The network of Example Embodiment 1, wherein the at least one message requests the wireless terminal to report only selected AI/ML related information.

Example Embodiment 17: The network of Example Embodiment 1, wherein the interface circuitry is comprised to receive at least one response message of AJ/ML related information from plural wireless terminals; and wherein the processor circuitry is configured to use the at least one response message to make a classification of the plural wireless terminals for use in further communications involving the AI/ML related information.

Example Embodiment 18: The network of Example Embodiment 17, wherein the processor circuitry is configured to make the classification using one or more of life cycle management (LCM) parameters, monitoring requirements, model features, key performance indicator(s) (KPI), model type, UE position, device type, and model delivery procedure.

Example Embodiment 19: The network of Example Embodiment 18, wherein the key performance indicator(s) (KPI) comprise one or more of a model performance KPI and a UE/device capability related KPI.

Example Embodiment 20: The network of Example Embodiment 17, wherein the processor circuitry is configured to make the classification of the plural wireless terminals in accordance with type of the AI/ML related information.

Example Embodiment 21: The network of Example Embodiment 17, wherein the processor circuitry is configured to make the classification of the plural wireless terminals in accordance with type of the AI/ML related information comprises:

(1) UE capability fixed information that does not vary over time;

(2) run-time AI/ML UE support capability which may vary over time, or (3) a combination of (1) and (2)

Example Embodiment 22: The network of Example Embodiment 17, wherein the processor circuitry is configured to prioritize the plural wireless terminals for further communications involving the AI/ML related information.

Example Embodiment 23: The network of Example Embodiment 1, wherein the processor circuitry is further configured to generate an update configuration message to request at least one update message from the wireless terminal; and wherein the interface circuitry is further configured to transmit the update configuration message to the wireless terminal.

Example Embodiment 24: The network of Example Embodiment 23, wherein the interface circuitry is comprised to receive an acknowledgement message for the update configuration message; and wherein the processor circuitry is configured to use the acknowledgment message to determine whether the wireless terminal either accepts or rejects the update configuration message.

Example Embodiment 25: The network of Example Embodiment 23, wherein the update configuration message requests the wireless terminal to report at least one update message of the AI/ML related information in a periodic manner.

Example Embodiment 26: The network of Example Embodiment 23, wherein the update configuration message requests the wireless terminal to report at least one update message of the AI/ML related information in a triggered manner.

Example Embodiment 27: The network of Example Embodiment 26, wherein the update configuration message includes a triggering condition for the report.

Example Embodiment 28: The network of Example Embodiment 27, wherein the triggering condition comprises one or more thresholds or limits.

Example Embodiment 29: The network of Example Embodiment 27, wherein the triggering condition comprises one or more key performance indicator(s) (KPI).

Example Embodiment 30: The network of Example Embodiment 1, wherein the interface circuitry is comprised to receive at least one update message of the AI/ML related information from the wireless terminal;

wherein the processor circuitry is configured to use the at least one update message to perform a further configuration of the wireless terminal with respect to communication of the AI/ML related information.

Example Embodiment 31: The network of Example Embodiment 30, wherein the further configuration comprises one of:

activating or deactivating a model;

switch or changing the model;

indicating to the wireless terminal to switch or to fall back a legacy functionality;

modifying, stopping, or continuing further reporting by the wireless terminal of the requested AI/ML related information;

initiating or stopping new functionalities;

allocating a new identifier to the model associated to a target functionality; and prioritizing or de prioritizing use of selected models.

Example Embodiment 32: A method in network including one or more nodes, the method comprising:

generating at least one message which requests the wireless terminal to report Artificial Intelligence/Machine Learning Model (AI/ML) related information to the network;

transmitting the at least one message to the wireless terminal.

Example Embodiment 33-Example Embodiment 63: Methods of operating the network nodes of Example Embodiment 2-Example Embodiment 31, respectively.

Example Embodiment 64: a wireless terminal which communicates over a radio interface with a radio access network, the wireless terminal comprising:

receiver circuitry configured to receive from the radio access network at least one message which requests the wireless terminal to report Artificial Intelligence/Machine Learning Model (AI/ML) related information to the network;

processor circuitry configured to generate at least one response message comprising the AI/ML related information of the wireless terminal which is requested in the at least one message;

transmitter circuitry configured to transmit the at least one response message to the network.

Example Embodiment 65: The wireless terminal of Example Embodiment 64, wherein the AI/ML related information comprises AI/ML related capability information of the wireless terminal, and wherein the processor circuitry is configured to include the AI/ML related capability information of the wireless terminal in the at least one response message.

Example Embodiment 66: The wireless terminal of Example Embodiment 64, wherein the AI/ML related information comprises AI/ML related support information of the wireless terminal, and wherein the processor circuitry is configured to include the AI/ML related support information of the wireless terminal in the at least one response message.

Example Embodiment 67: The wireless terminal of Example Embodiment 64, wherein the receiver circuitry is configured to receive the at least one message using L1/L2/L3 or upper layer signaling.

Example Embodiment 68: The wireless terminal of Example Embodiment 64, wherein the receiver circuitry is configured to receive the at least one message using dedicated or broadcast/multicast signaling.

Example Embodiment 69: The wireless terminal of Example Embodiment 64, wherein the at least one message comprises identities of live-run-time information and/or fixed information that are to be reported, and wherein the processor circuitry is configured to generate the at least one response message to include the live-run-time information and/or the fixed information which are identified by the identities.

Example Embodiment 70: The wireless terminal of Example Embodiment 69, wherein the at least response message reports the run-time information and the fixed information individually or separately.

Example Embodiment 71: The wireless terminal of Example Embodiment 70, wherein the run-time information and the fixed information are reported in a same response message.

Example Embodiment 72: The wireless terminal of Example Embodiment 70, wherein the run-time information and the fixed information are reported in different response messages.

Example Embodiment 73: The wireless terminal of Example Embodiment 64, wherein the at least one message which requests the wireless terminal to report the AI/ML related information is an extended version of a message that requests that the wireless terminal report non-AI/ML related information.

Example Embodiment 74: The wireless terminal of Example Embodiment 64, wherein the at least one message requests the wireless terminal to report the AI/ML related information is in addition to another message that requests that the wireless terminal report non-AI/ML related information.

Example Embodiment 75: The wireless terminal of Example Embodiment 64, wherein the at least one message requests the wireless terminal to report a subset of AI/ML related information of the wireless terminal to the network, and wherein the processor circuitry is configured to report the subset in the at least one response message.

Example Embodiment 76: The wireless terminal of Example Embodiment 75, wherein the subset of AI/ML related information comprises run-time AI/ML support capability which may vary over time.

Example Embodiment 77: The wireless terminal of Example Embodiment 64, wherein the at least one message requests the wireless terminal to report only selected AI/ML related information, and wherein the processor circuitry is configured to report only selected AI/ML related information in the at least one response message.

Example Embodiment 78: The wireless terminal of Example Embodiment 64, wherein the receiver circuitry is further configured to receive an update configuration message from the network, the update configuration message comprising an update configuration for at least one update message requested of the wireless terminal by the network.

Example Embodiment 79: The wireless terminal of Example Embodiment 78, wherein the processor circuitry is further configured to generate an update configuration request message from the network, the update configuration request message being configured to request that the network provide the wireless terminal with the update configuration request message.

Example Embodiment 80: The wireless terminal of Example Embodiment 78, wherein the processor circuitry is further configured to accept or reject the update configuration from the network and to generate an acknowledgement message for the update configuration message, and wherein the acknowledgement message for the configuration message comprises an indication whether the wireless terminal either accepts or rejects the update configuration from the network.

Example Embodiment 81: The wireless terminal of Example Embodiment 78, wherein the processor circuitry is configured determine a time at which the at least one update message is to be generated and to generate the at least one update message in a periodic manner.

Example Embodiment 82: The wireless terminal of Example Embodiment 78, wherein the processor circuitry is configured determine occurrence of a triggering event for which the at least one update message is to be generated and to generate the at least one update message in a triggered manner.

Example Embodiment 83: The wireless terminal of Example Embodiment 82, wherein the update configuration message includes a triggering condition for the report.

Example Embodiment 84: The wireless terminal of Example Embodiment 83, wherein the triggering condition comprises one or more thresholds or limits.

Example Embodiment 85: The wireless terminal of Example Embodiment 83, wherein the triggering condition comprises one or more key performance indicator(s) (KPI).

Example Embodiment 86: The wireless terminal of Example Embodiment 64, wherein the receiver circuitry is configured receive a further configuration message from the network, and wherein the further configuration message requests a further configuration of the wireless terminal with respect to communication of the AI/ML related information, and wherein the processor circuitry is configured to perform the further configuration.

Example Embodiment 87: The wireless terminal of Example Embodiment 86, wherein the further configuration comprises one of:

- activating or deactivating a model;
- switch or changing the model;
- indicating to the wireless terminal to switch or to fall back a legacy functionality;
- modifying, stopping, or continuing further reporting by the wireless terminal of the requested AI/ML related information;
- initiating or stopping new functionalities;
- allocating a new identifier to the model associated to a target functionality; and,
- prioritizing or de prioritizing use of selected models.

Example Embodiment 88-Example Embodiment 110: Methods of operating the wireless terminals of Example Embodiment 65-Example Embodiment 87, respectively.

Example Embodiment 111: A network including one or more nodes which comprise:

- processor circuitry configured to generate at least one message which requests the wireless terminal to report Artificial Intelligence/Machine Learning Model (AI/ML) related information to the network;
- interface circuitry configured:
  - to transmit the at least one message to the wireless terminal; and
  - to receive at least one resource restriction response message from the wireless terminal, the resource restriction response message comprising an indication that the wireless terminal guards AI/ML model and/or AI/ML functions of the wireless terminal.

Example Embodiment 112: The network of Example Embodiment 111, wherein the processor circuitry is configured to generate a resource restriction notification message to configure the wireless terminal to generate the resource restriction response message, and wherein the interface circuit is configured to transmit the resource restriction notification message to the wireless terminal.

Example Embodiment 113: The network of Example Embodiment 111, wherein the resource restriction response message comprises an indication of a cause for limiting access of the network to the run-time AI/ML support capability information of the wireless terminal.

Example Embodiment 114: The network of Example Embodiment 111, wherein upon receipt of the at least one resource restriction response message the processor circuitry is configured to generate a switching message for transmission to the wireless terminal, and wherein the switching message is configured to request the wireless terminal to perform at least one of the following:

- activating or deactivating a model;
- switching, or changing, or updating the model;
- indicating to the wireless terminal to switch or to fall back a legacy functionality.

Example Embodiment 115: The network of Example Embodiment 111, wherein the network comprises an access node which includes the processor circuitry.

Example Embodiment 116: The network of Example Embodiment 111, wherein the network comprises a core network node which includes the processor circuitry.

Example Embodiment 117: The network of Example Embodiment 111, wherein the AI/ML related information comprises AI/ML related capability information of the wireless terminal.

Example Embodiment 118: The network of Example Embodiment 111, wherein the AI/ML related information comprises AI/ML related support information of the wireless terminal.

Example Embodiment 119: The network of Example Embodiment 111, wherein the interface circuitry is configured to transmit the at least one message using L1/L2/L3 or upper layer signaling.

Example Embodiment 120: The network of Example Embodiment 111, wherein the interface circuitry is configured to transmit the at least one message using dedicated or broadcast/multicast signaling.

Example Embodiment 121: The network of Example Embodiment 111, wherein the at least one message comprises identities of live-run-time information and/or fixed information that are to be reported.

Example Embodiment 121: The network of Example Embodiment 121, wherein the at least one message identifies the run-time information and the fixed information individually or separately.

Example Embodiment 122: The network of Example Embodiment 121, wherein the run-time information and the fixed information are identified in a same message.

Example Embodiment 123: The network of Example Embodiment 121, wherein the run-time information and the fixed information are identified in different messages.

Example Embodiment 124: The network of Example Embodiment 111, wherein the at least one message which requests the wireless terminal to report the AI/ML related information is an extended version of a message that requests that the wireless terminal report non-AI/ML related information.

Example Embodiment 125: The network of Example Embodiment 111, wherein the at least one message requests the wireless terminal to report the AI/ML related information is in addition to another message that requests that the wireless terminal report non-AI/ML related information.

Example Embodiment 126: The network of Example Embodiment 111, wherein the at least one message requests the wireless terminal to report a subset of AI/ML related information of the wireless terminal to the network.

Example Embodiment 127: The network of Example Embodiment 126, wherein the subset of AI/ML related information comprises run-time AI/ML support capability which may vary over time.

Example Embodiment 128: The network of Example Embodiment 111, wherein the at least one message requests the wireless terminal to report only selected AI/ML related information.

Example Embodiment 129: The network of Example Embodiment 111, wherein the at least one resource restriction response message indicates that the wireless terminal rejects the update configuration message.

Example Embodiment 130: A method in a network including one or more nodes, the method comprising:

- generating at least one message which requests a wireless terminal to report Artificial Intelligence/Machine Learning Model (AI/ML) related information to the network;
- transmitting the at least one message to the wireless terminal; and
- receiving at least one resource restriction response message from the wireless terminal, the resource restriction response message comprising an indication that the wireless terminal guards AI/ML model and/or AI/ML functions of the wireless terminal.

Example Embodiment 131-Example Embodiment 148: Methods of operating the network nodes of Example Embodiment 112-Example Embodiment 129, respectively.

Example Embodiment 149: A wireless terminal comprising:

- receiver circuitry configured to receive from a radio access network at least one message which requests the wireless terminal to report Artificial Intelligence/Machine Learning Model (AI/ML) related information to the network;
- processor circuitry configured to generate at least one resource restriction response message from the wireless terminal, the resource restriction response message comprising an indication that the wireless terminal guards AI/ML model and/or AI/ML functions of the wireless terminal;
- transmitter circuitry configured to transmit the at least one resource restriction response message to the network.

Example Embodiment 150: The wireless terminal of Example Embodiment 149,

- wherein the processor circuitry is further configured to generate at least one response message comprising the AI/ML related information of the wireless terminal which is requested in the at least one message; and
- wherein the transmitter circuitry is further configured to transmit the at least one response message to the network.

Example Embodiment 151: The wireless terminal of Example Embodiment 149, wherein the receiver circuitry is configured to receive a resource restriction notification message from the network, and the processor circuitry is configured to generate the resource restriction response message in response to the resource restriction notification message.

Example Embodiment 152: The wireless terminal of Example Embodiment 149, wherein the processor circuitry is configured to generate the resource restriction response message whereby the resource restriction response message comprises an indication of a cause for limiting access of the network to the run-time AI/ML support capability information of the wireless terminal.

Example Embodiment 153: The wireless terminal of Example Embodiment 149, wherein the processor circuitry is configured to generate a support inability message to indicate that the wireless terminal cannot support any model features/functions or related capability functionalities at a given time, and wherein the transmitter circuitry is configured to transmit the support inability message to the network.

Example Embodiment 154: The wireless terminal of Example Embodiment 149, wherein the processor circuitry is configured to autonomously change at least a part or all AI/ML model-based functionalities; and wherein the transmitter circuitry is configured to report the changes to the network.

Example Embodiment 155: The wireless terminal of Example Embodiment 149, wherein the processor circuitry is configured to autonomously perform one or more of the following:

- (de) activate the part or the all AI/ML model-based functionalities;
- switch the part or the all AI/ML model-based functionalities;
- fall back from the part or the all AI/ML model-based functionalities; and
- modify a parameter of the part or the all AI/ML model-based functionalities.

Example Embodiment 156: The wireless terminal of Example Embodiment 149,

- wherein the receiver circuitry is further configured to receive an update configuration message from the network, the update configuration message being configured to request at least one update message from the wireless terminal; and
- wherein the processor circuitry is further configured to generate the at least one resource restriction response message in response to the update configuration message.

Example Embodiment 157: The wireless terminal of Example Embodiment 149, wherein processor circuitry is configured to reject the update configuration message and wherein the at least one resource restriction response message indicates that the wireless terminal rejects the update configuration message.

Example Embodiment 158: A method of operating a wireless terminal comprising:

- receiving from a radio access network at least one message which requests the wireless terminal to report Artificial Intelligence/Machine Learning Model (AI/ML) related information to the network;
- generating at least one resource restriction response message from the wireless terminal, the resource restriction response message comprising an indication that the wireless terminal guards AI/ML model and/or AI/ML functions of the wireless terminal;
- transmitting the at least one resource restriction response message to the network.

Example Embodiment 159-Example Embodiment 168: Methods of operating the wireless terminals of Example Embodiment 149-Example Embodiment 157, respectively.

Example Embodiment 160: The network of Example Embodiment 1, wherein the interface circuitry is comprised to receive at least one response message of AI/ML related information from the wireless terminal; and

- wherein the processor circuitry is configured to use the at least one response message to make a determination if the wireless terminal is AI/ML capable.

One or more of the following documents may be pertinent to the technology disclosed herein (all of which are incorporated herein by reference in their entirety):

R2-2300398, 3GPP TSG-RAN WG2 Meeting #121, Athens, Greece, 27 Feb.-3 Mar. 2023, Nokia, Nokia Shanghai Bell "AI/ML methods"
R2-2xxxxxx, GPP TSG-RAN WG2 Meeting #121, Athens, Greece, Feb. 27-Mar. 3, 2023, RAN2 Chairman (MediaTek), "Chair Notes"
R1-2301254, 3GPP TSG RAN WG1 #112, Athens, Greece, Feb. 27-Mar. 3, 2023, Samsung, "General aspects of AI ML framework and evaluation methodology."
R1-230xxxx, 3GPP TSG RAN WG1 Meeting #112bis-e, Online, Apr. 17-26, 2023, MCC Support, "Draft Report of 3GPP TSG RAN WG1 #112 v0.4.0" (Athens, Greece, 27 Feb.-3 Mar. 2023)

Although the description above contains many specificities, these should not be construed as limiting the scope of the technology disclosed herein but as merely providing illustrations of some of the presently preferred embodiments of the technology disclosed herein. Thus, the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

What is claimed is:

1. A wireless terminal comprising:
receiving circuitry configured to:
receive, from a radio access network, at least one message which requests the wireless terminal to report Artificial Intelligence/Machine Learning (AI/ML) model related information to the radio access network,
receive, from the radio access network, a first AI/ML configuration that specifies a first plurality of AI/ML models for activation by the wireless terminal, and
receive, from the radio access network, a second AI/ML configuration that specifies a second plurality of AI/ML models for activation by the wireless terminal, the second AI/ML configuration being a modified configuration of the first AI/ML configuration;
processing circuitry configured to:
autonomously perform an AI/ML capabilities modification operation in run-time to modify AI/ML resources and/or AI/ML functions of one of the first plurality of AI/ML models and thereby to restrict and guard the AI/ML resources and/or the AI/ML functions of the one of the first plurality of AI/ML models based on hardware and/or software limitations of the wireless terminal, the hardware and/or software limitations comprising at least one of:
compute power availability of the wireless terminal,
power consumption of the wireless terminal, and
hardware/software resource usage of the wireless terminal, and
generate at least one resource restriction response message to transmit to the radio access network, the at least one resource restriction response message comprising:
an indication that the wireless terminal restricts and guards the AI/ML resources and/or the AI/ML functions of the wireless terminal, and
a preference indication for another AI/ML model in the first plurality of AI/ML models or another AI/ML model in the second plurality of AI/ML models; and
transmitting circuitry configured to transmit the at least one resource restriction response message to the radio access network.

2. The wireless terminal of claim 1, wherein the receiving circuitry is further configured to receive a resource restriction notification message from the radio access network, and
the processing circuitry is configured to generate the at least one resource restriction response message in response to receiving the resource restriction notification message.

3. The wireless terminal of claim 1, wherein the at least one resource restriction response message further comprises an indication of a cause of limiting access of the radio access network to run-time AI/ML support capability information of the wireless terminal.

4. The wireless terminal of claim 1, wherein:
the processing circuitry is further configured to generate a support inability message to indicate that the wireless terminal does not support any model features/functions or related capability functionalities at a given time, and
the transmitting circuitry is further configured to transmit the support inability message to the radio access network.

5. A method of operating a wireless terminal comprising:
receiving, from a radio access network, at least one message which requests the wireless terminal to report Artificial Intelligence/Machine Learning (AI/ML) model related information to the radio access network;
receiving, from the radio access network, a first AI/ML configuration that specifies a first plurality of AI/ML models for activation by the wireless terminal, and
receiving, from the radio access network, a second AI/ML configuration that specifies a second plurality of AI/ML models for activation by the wireless terminal, the second AI/ML configuration being a modified configuration of the first AI/ML configuration;
autonomously performing an AI/ML capabilities modification operation in run-time to modify AI/ML resources and/or AI/ML functions of one of the first plurality of AI/ML models and thereby to restrict and guard the AI/ML resources and/or the AI/ML functions of the one of the first plurality of AI/ML models based on hardware and/or software limitations of the wireless terminal, the hardware and/or software limitations comprising at least one of:
compute power availability of the wireless terminal,
power consumption of the wireless terminal, and
hardware/software resource usage of the wireless terminal;

generating at least one resource restriction response message to transmit to the radio access network, the at least one resource restriction response message comprising:

an indication that the wireless terminal restricts and guards the AI/ML resources and/or the AI/ML functions of the wireless terminal, and a preference indication for another AI/ML model in the first plurality of AI/ML models or another AI/ML model in the second plurality of AI/ML models; and transmitting the at least one resource restriction response message to the radio access network.

6. The wireless terminal of claim 1, wherein the processing circuitry is further configured to perform, as the AI/ML capabilities modification operation, at least one of:

making a change to an AI/ML model configuration and/or an AI/ML model parameter, activating, or deactivating, the AI/ML model configuration and/or the AI/ML model parameter, switching AI/ML models, and falling back to a legacy functionality.

7. The wireless terminal of claim 1, wherein the processing circuitry is further configured to, upon the autonomous performance of the AI/ML capabilities modification operation, start a timer for providing the at least one resource restriction response message to the radio access network.

8. The wireless terminal of claim 1, wherein the processing circuitry is configured to autonomously perform the AI/ML capabilities modification operation by rejecting a configuration received by the wireless terminal from the radio access network.

9. The wireless terminal of claim 1, wherein the processing circuitry is further configured to generate a cause message that indicates a cause for the autonomous performance of the AI/ML capabilities modification operation, and the transmitting circuitry is further configured to transmit the cause message to the radio access network.

10. The method of claim 5, further comprising performing, as the AI/ML capabilities modification operation, at least one of:

making a change to an AI/ML model configuration and/or an AI/ML model parameter;

activating, or deactivating, the AI/ML model configuration and/or the AI/ML model parameter;

switching AI/ML models; and falling back to a legacy functionality.

11. The method of claim 5, further comprising, upon the autonomous performance of the AI/ML capabilities modification operation, starting a timer for providing the at least one resource restriction response message to the radio access network.

12. The method of claim 5, wherein the AI/ML capabilities modification operation is autonomously performed by rejecting a configuration received by the wireless terminal from the radio access network.

13. The method of claim 5, further comprising:

generating a cause message that indicates a cause for the autonomous performance of the AI/ML capabilities modification operation; and transmitting the cause message to the radio access network.

* * * * *